Patented Apr. 20, 1943

2,317,012

UNITED STATES PATENT OFFICE 2,317,012

β-p-METHOXYPHENYLPROPYL BENZYLAMINE

Eugene H. Woodruff, Kalamazoo, Mich., assignor to The Upjohn Company, Kalamazoo, Mich.

No Drawing. Application April 4, 1941,
Serial No. 386,861

1 Claim. (Cl. 260—570.9)

This invention relates to improvements in β-p-methoxyphenylpropyl benzyl amine.

This invention relates to a new and useful product which is physiologically active for the treatment of asthma and the like. The product is particularly useful because it has a high bronchodilator effect with pressor effect so low that in therapeutic doses it is practically nil.

The objects of this invention are:

First, to produce a new and useful product.

Second, to produce such a product physiologically active as a therapeutic agent for treating asthma which has a very high bronchodilator effect and which has a practically negligible pressor effect.

Third, to provide such a substance of low toxicity.

Fourth, to produce such a product which may be administered orally.

Further objects and advantages will appear from the description to follow. The invention is pointed out in the claim.

My new product may be termed β-p-methoxyphenylpropyl benzyl amine. This amine may be prepared as follows:

49.5 grams (0.3 mole) β-p-methoxypheny propyl amine and 30.8 grams (0.3 mole) benzaldehyde and 100 cc. absolute alcohol were placed in a 500 cc. round bottom flask equipped with a reflux condenser and warmed on a steam bath for thirty minutes. The alcohol was removed by distillation and the residual oil distilled in vacuo. B. P. 213° C. at 12 mm. Hg. Yield 75.3 grams or 98 per cent of theoretical.

25.3 grams (0.1 mole) β-p-methoxyphenylpropyl benzal amine, 100 cc. of absolute and a teaspoonful of Raney Nickel catalyst were placed in a bottle and reduced by hydrogen using an Adams reducing apparatus. After three hours the theoretical amount of hydrogen was absorbed. The catalyst was removed by filtration and the solvent and finally the amine were separated by distillation. B. P. 209–212° at 14 mm. Hg. Yield 20 grams or 78 per cent of theoretical.

The hydrochloride was obtained by adding an etherial solution of the amine to a warm absolute alcoholic hydrogen chloride solution. When recrystallized from anhydrous alcohol-ether, the hydrochloride melted at 152° C.

The physiological properties of the compound are as follows:

Toxicity_____ 20 mg./kg.
Blood pressure ___ Negative
Lung_____ 16 bubbles per minute increase By the Sollman von Oettingen isolated lung technique, this compound, when injected in ½ and 1 cc. doses, gave an average bronchodilator effect as shown by an increased flow measured as 16 bubbles per minute. Ephedrine by the same technique and at the same doses showed an average increased flow of two bubbles per minute.

Salts of this amine may also be used. Salts of inorganic mineral acids and organic carboxylic acids may be used. Among the available salts are those formed from the following acids: formic, acetic, propionic, butyric, valeric, hexoic, lauric, myristic, palmitic, stearic, oleic, oxalic, succinic, glutaric, adipic, maleic, fumaric, lactic, tartaric, hydrobromic, hydriodic, carbonic, boric, acids of phosphorus, sulfuric, sulfonic, alkylhydrogen sulfuric and nitric. Salts of such weak acids as carbonic may also be employed. In fact, any acid addition salt corresponding to an ammonium salt may be utilized as would be apparent to one skilled in the art as the product of this application may be considered as an ammonia.

Having thus described my invention, what I claim as new and desire to secure by Letters Patent is:

A physiologically active therapeutic agent capable of producing bronchodilator effects comprising essentially a β-p-methoxyphenylpropyl benzylamine of the group consisting of β-p-methoxyphenylpropyl benzylamine and salts thereof.

EUGENE H. WOODRUFF.